US011518004B2

(12) United States Patent
Johnson

(10) Patent No.: US 11,518,004 B2
(45) Date of Patent: Dec. 6, 2022

(54) BUMPER APPARATUS

(71) Applicant: Innovative Tools & Technologies, Inc., St. Paul, MN (US)

(72) Inventor: Bryan T. Johnson, St. Paul, MN (US)

(73) Assignee: Innovative Tools & Technologies, Inc., St. Paul, MN (US)

( * ) Notice: Subject to any disclaimer, the term of this patent is extended or adjusted under 35 U.S.C. 154(b) by 124 days.

(21) Appl. No.: 17/067,449

(22) Filed: Oct. 9, 2020

(65) Prior Publication Data

US 2021/0107118 A1 Apr. 15, 2021

Related U.S. Application Data

(60) Provisional application No. 62/914,036, filed on Oct. 11, 2019.

(51) Int. Cl.
   *B25B 11/00* (2006.01)
   *B25B 11/02* (2006.01)
   *B62D 65/02* (2006.01)

(52) U.S. Cl.
   CPC ............ *B25B 11/02* (2013.01); *B62D 65/026* (2013.01)

(58) Field of Classification Search
   CPC ........ B25B 11/00; B25B 11/02; B62D 65/026
   See application file for complete search history.

(56) References Cited

U.S. PATENT DOCUMENTS

| 574,529 | A | | 1/1897 | Elliott |
|---|---|---|---|---|
| 783,031 | A | | 2/1905 | Fell |
| 1,833,355 | A | | 11/1931 | Dahms |
| 2,324,803 | A | | 7/1943 | Snyder |
| 2,459,080 | A | | 1/1949 | Killius |
| 2,793,425 | A | | 5/1957 | Koban |
| 2,799,920 | A | | 7/1957 | Hansen |
| 2,803,872 | A | | 8/1957 | Massa |
| 2,887,974 | A | | 5/1959 | Weinfeld |
| 2,976,033 | A | | 3/1961 | Martin |
| 2,995,357 | A | | 8/1961 | Dennis et al. |
| 3,220,565 | A | | 11/1965 | Wells |
| 4,029,308 | A | | 6/1977 | Mathers |
| 4,070,011 | A | * | 1/1978 | Glesser ............... F16M 13/022 269/45 |
| 4,180,252 | A | | 12/1979 | Cushenbery |
| 4,183,511 | A | | 1/1980 | Marek |
| 4,221,368 | A | | 9/1980 | Channel |
| 4,531,720 | A | | 7/1985 | Soder |
| 4,676,491 | A | | 6/1987 | Radlof |
| 4,771,980 | A | | 9/1988 | Dubbs et al. |

(Continued)

*Primary Examiner* — Lee D Wilson
(74) *Attorney, Agent, or Firm* — Mueting Raasch Group

(57) ABSTRACT

A bumper apparatus for securing a vehicle bumper during painting and repair is described herein. The apparatus includes a base support structure, a frame coupled to the base support structure, at least one rear coupler arm movably coupled to the frame, at least one front coupler arm movably coupled to the frame via a front coupler attachment, and a front coupler. The front coupler attachment includes a frame portion movably coupled to the frame, a ball portion fixedly coupled to the frame portion, a socket portion configured to receive the ball portion, and an arm portion movably coupled to the at least one front coupler arm. The front coupler is movably coupled to the at least one front coupler arm and is configured to be releasably coupled to the vehicle bumper.

20 Claims, 10 Drawing Sheets

(56) References Cited

U.S. PATENT DOCUMENTS

| | | | |
|---|---|---|---|
| 4,848,759 A | 7/1989 | Gardener | |
| 4,943,040 A | 7/1990 | Finstad et al. | |
| 5,127,359 A | 7/1992 | Kannari et al. | |
| 5,135,205 A | 8/1992 | Bedard | |
| 5,259,602 A | 11/1993 | Rogos | |
| 5,294,098 A | 3/1994 | Bundy | |
| 5,296,030 A | 3/1994 | Young | |
| 6,173,947 B1 * | 1/2001 | Johnson | F16M 11/40 269/69 |
| 7,448,606 B1 * | 11/2008 | Johnson | B05B 13/0285 269/16 |
| 8,328,173 B1 * | 12/2012 | DesForge | B62B 3/04 248/176.1 |
| 8,690,137 B2 * | 4/2014 | Cahill | B25H 1/0007 118/620 |
| 2008/0142652 A1 * | 6/2008 | Johnson | B25B 5/006 248/176.1 |
| 2012/0242022 A1 * | 9/2012 | Gagnon, Jr. | B25B 11/00 269/9 |
| 2021/0107118 A1 * | 4/2021 | Johnson | B25B 5/006 |

* cited by examiner

BUMPER APPARATUS

The present application claims benefit of U.S. Provisional Application No. 62/914,036, filed on Oct. 11, 2019, which is incorporated herein by reference in its entirety.

The present disclosure relates generally to a bumper stand and holder to securely retain and position a bumper (e.g., vehicle bumper) during painting and/or repair.

BACKGROUND

Bumpers (e.g., bumper covers, bumper shrouds, etc.) that are coupled to vehicles are often made of plastic. While repairing and/or painting, the bumpers are most often removed from the vehicle. As compared to steel bumpers, plastic bumpers are often "floppy" and do not maintain a constant shape unassisted, therefore, making it more difficult to paint and/or repair plastic bumpers without necessary support. While bumper racks or stands exist, plastic bumpers often simply lay on the stands or hang from the stands without anything securely positioning the plastic bumpers in a desired orientation. Further, known stands do not work well with paint baking processes because, during baking, the plastic bumpers begin to soften and the known stands do not provide necessary support. In some cases, when plastic bumpers are heated using known stands, the bumpers may distort and lose their original shape, causing them to no longer fit back onto a vehicle appropriately.

Furthermore, as car designs become more intricate and specialized, so to do the corresponding plastic bumpers associated therewith. For example, some plastic bumpers are designed to surround a large front grille, which is removed during repair and/or painting. The regions of the bumper proximate where the large front grille is coupled to may provide very little structural support without the front grille coupled thereto. In particular, various portions of the plastic bumper proximate the front grille may be smaller than other portions of the bumper or may be cantilevered relative to the remainder of the bumper. As such, the front grille support portion (e.g., the area or region of the bumper about or proximate where the front grille may be positioned and coupled to) of the bumper may require additional support. Therefore, it may be desirable to have a bumper stand or holder which securely holds and positions various different portions of a bumper, including the portions or regions proximate where the front grille may be positioned and coupled to, during, e.g., painting and/or repair.

SUMMARY

Embodiments described herein may provide a bumper apparatus (e.g., holder, stand, etc.) configured to secure and position a vehicle bumper during painting and repair. For example, in one embodiment, the bumper apparatus may include a base support structure, a frame coupled to the base support structure, at least one rear coupler arm movably coupled to the frame, at least one front coupler arm movably coupled to the frame via a front coupler attachment, and a front coupler movably coupled to the at least one front coupler arm and configured to be releasably coupled to the vehicle bumper. The front coupler attachment may include a frame portion movably coupled to the frame, a ball portion fixedly coupled to the frame portion, a socket portion configured to receive the ball portion such that the ball portion pivots relative to the socket portion, and an arm portion fixedly coupled to the socket portion and movably coupled to the at least one front coupler arm.

In another embodiment, a bumper apparatus may include a base support structure, a frame coupled to the base support structure, at least one front coupler arm, and a front coupler. The frame may include a right-side bar portion, a left-side bar portion, a front bar portion between the right-side and left-side bar portions, and a rear bar portion between the right-side and left-side bar portions. The at least one front coupler arm may be movably coupled to the frame forward of a point at which the frame is coupled to the base support structure and the at least one front coupler arm may be movably coupled to the frame such that the at least one front coupler arm may be configured to pivot relative to the frame about a frame axis point. The front coupler may be movably coupled to the at least one front coupler arm such that the front coupler may be configured to pivot relative to the at least one front coupler arm about a coupler axis point. The front coupler may be configured to be releasably couplable to the vehicle bumper.

In yet another embodiment, a vehicle bumper may include a front portion and side portions extending from opposite ends of the front portion. The vehicle bumper may also include at least one grille support portion extending from the front portion in a direction away from the side portions. The apparatus may include a base support structure, a frame coupled to the base support structure, at least on rear coupler arm movably coupled to the frame, a rear coupler, at least one front coupler arm movably coupled to the frame, and a front coupler. The rear coupler may be movably coupled to the at least one rear coupler arm and may be configured to be releasably couplable to one of the side portions of the vehicle bumper. The front coupler may be movably coupled to the at least one front coupler arm and configured to be releasably couplable to the at least one grille support portion of the vehicle bumper.

The above summary is not intended to describe each embodiment or every implementation. Rather, a more complete understanding of illustrative embodiments will become apparent and appreciated by reference to the following Detailed Description of Exemplary Embodiments and Claims in view of the accompanying figures of the drawing.

BRIEF DESCRIPTION OF THE VIEWS OF THE DRAWING

Exemplary embodiments will be further described with reference to the figures of the drawing, wherein.

Figure 1A:
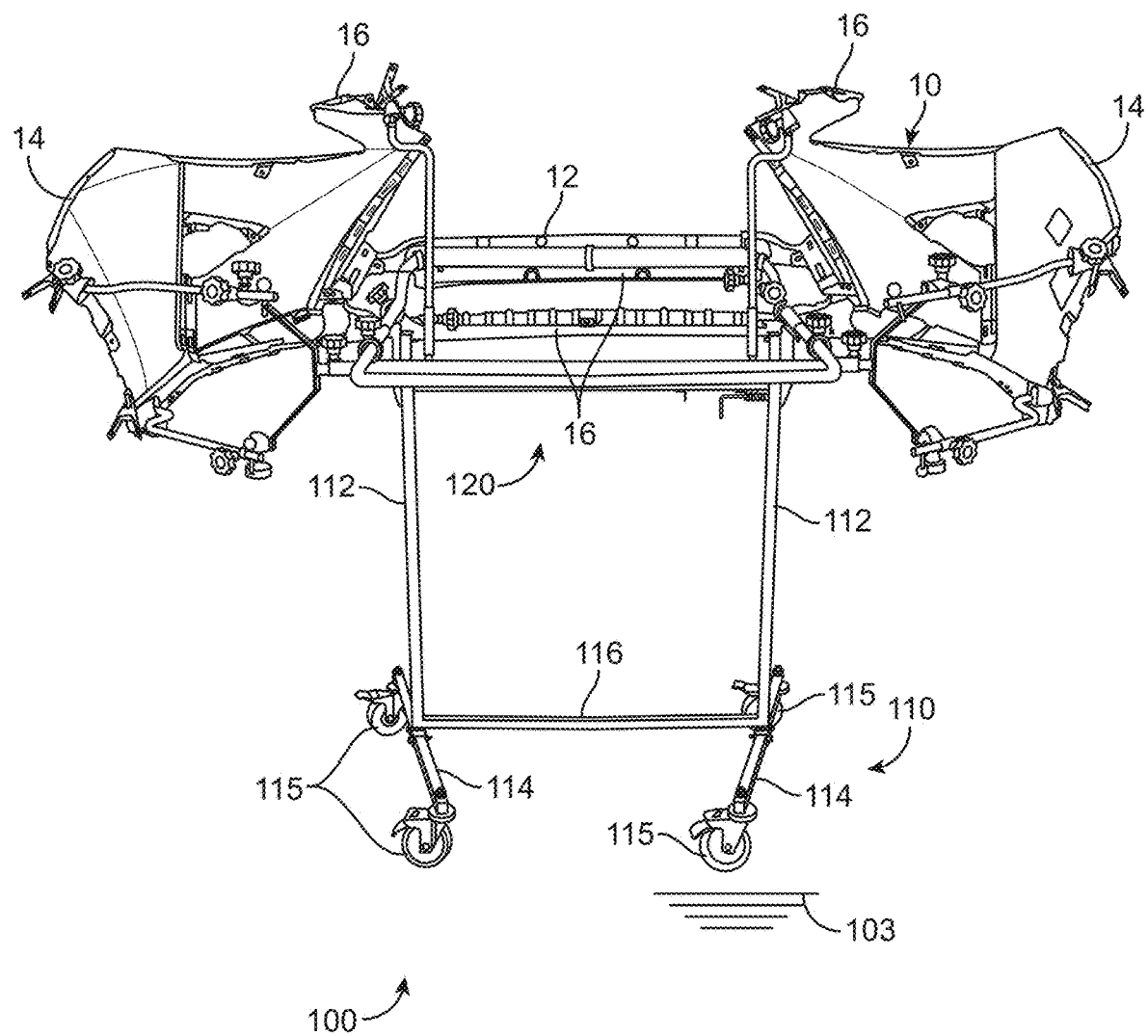
FIG. 1A is a rear perspective view of an illustrative bumper stand including a vehicle bumper coupled thereto.

The figures are rendered primarily for clarity and, as a result, are not necessarily drawn to scale. Moreover, various structure/components, including but not limited to fasteners, and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly contemplated. Unless otherwise indicated, all numbers expressing quantities, and all terms expressing direction/orientation (e.g., vertical, horizontal, parallel, perpendicular, etc.) in the specification and claims are to be understood as being modified in all instances by the term "about."

Generally, embodiments of the present disclosure may be directed to a bumper apparatus (e.g., stand, holder, rack, etc.) that is configured to securely couple to and position a vehicle bumper (e.g., an automobile bumper shroud or bumper cover) during, for example, painting and repairing the bumper. For example, the bumper apparatus may include coupler arms that may be positioned on the bumper apparatus to most effectively support the vehicle bumper (e.g., couplers may be movably coupled to the coupler arm and may be configured to be removably attached to the vehicle bumper at various locations). Specifically, the coupler arms may be positioned proximate portions of the vehicle bumper such that couplers corresponding to each of the coupler arms may attach to the vehicle bumper along the periphery or at ends of the vehicle bumper. Further, each of the coupler arms may be configured to independently move along various degrees of rotation and movement to best position the coupler arm relative to the vehicle bumper. Specifically, the coupler arms and corresponding couplers may have discrete and distinct points of rotation/pivot and translate linearly to better control movement of the coupler arms used to couple to the vehicle bumper (e.g., as compared to coupler arms with amorphous and infinite adjustability).

Figure 1B:
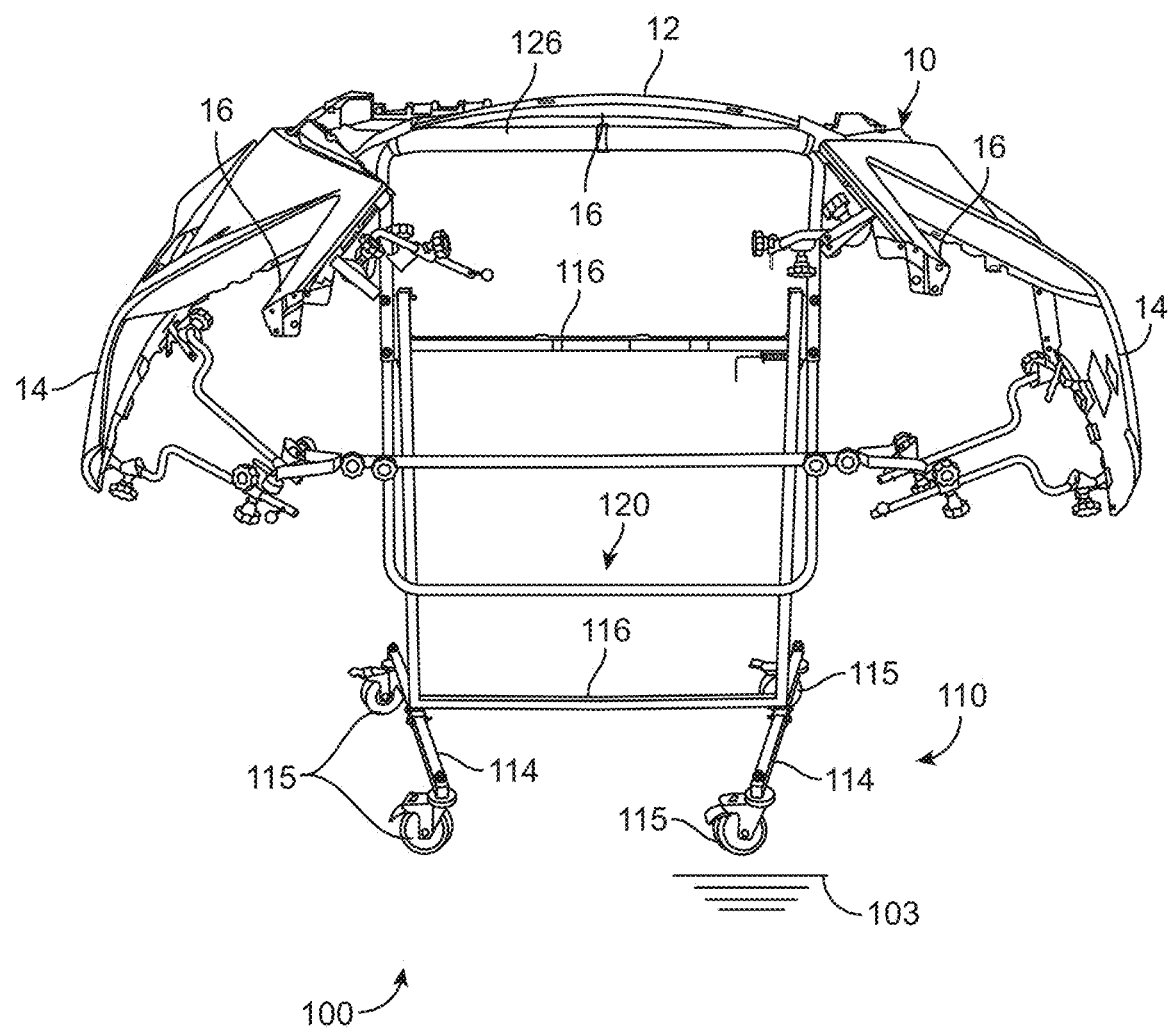
FIG. 1B is the bumper stand of FIG. 1A with the vehicle bumper rotated in a generally vertical orientation.
Figure 1C:
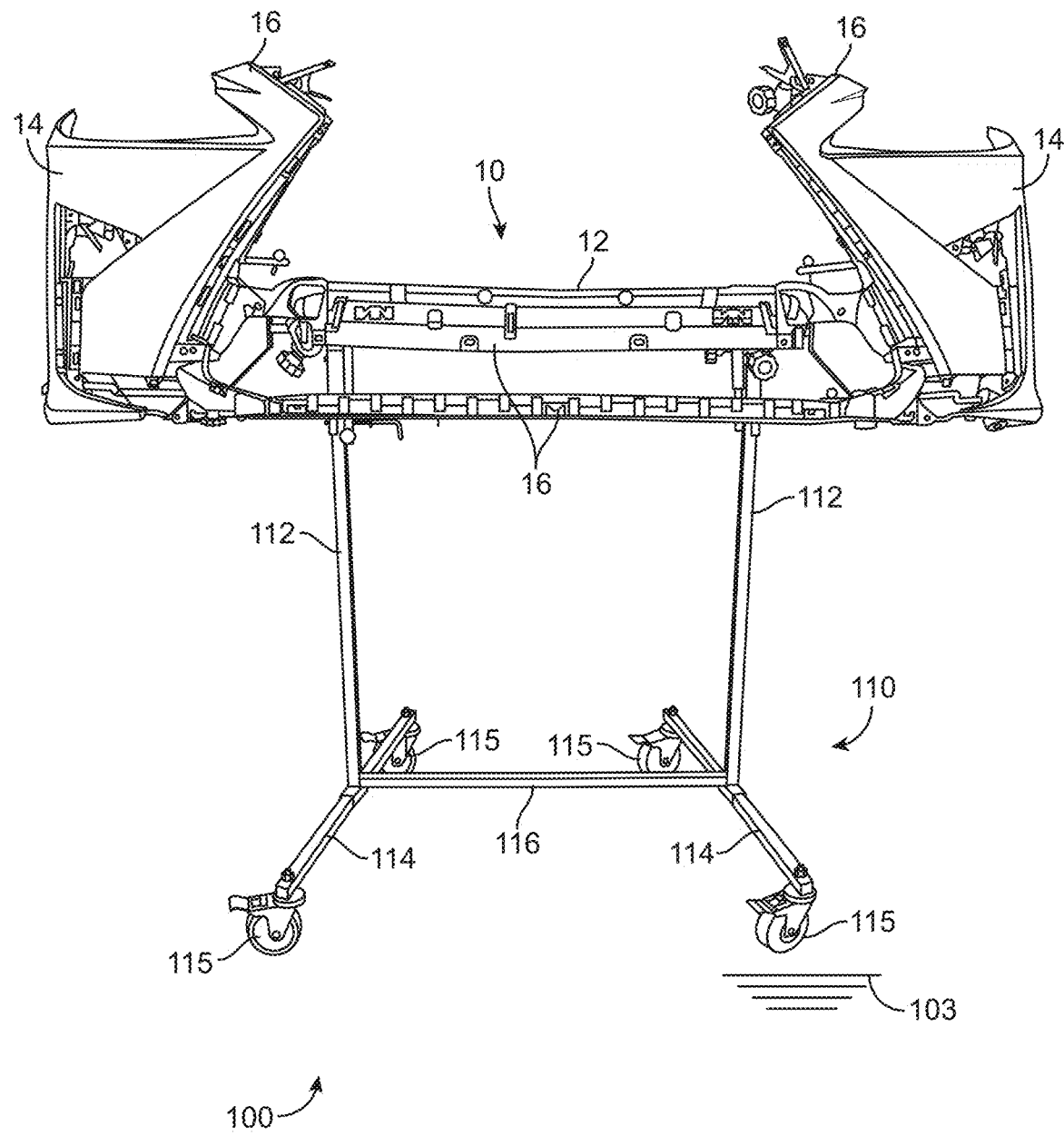
FIG. 1C is a front perspective view of the bumper stand of FIG. 1A.

With reference to the figures of the drawing, wherein like reference numerals designate like parts and assemblies throughout the several views, FIGS. 1A-1C illustrate a bumper apparatus 100 in accordance with illustrative embodiments of the present disclosure. It is noted that the term "comprises" (and variations thereof) does not have a limiting meaning where this term appears in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective of the bumper apparatus 100 in a conventional configuration, e.g., while the bumper apparatus 100 is positioned such that the ground engaging members 115 rest upon a ground surface 103. These terms are used only to simplify the description, however, and not to limit the interpretation of any embodiment described.

As shown in FIGS. 1A-1C, the bumper apparatus 100 is illustrated with a vehicle bumper 10 (e.g., bumper cover, bumper shroud, etc.) removably coupled thereto. The vehicle bumper 10 may be associated with any suitable vehicle including, for example, automobiles. The vehicle bumper 10 may include a front portion 12 (e.g., corresponding to the front of the vehicle) and side portions 14 extending from opposite ends of the front portion 12. The side portions 14 of the vehicle bumper 10 may be configured to extend around the sides of the vehicle upon which the bumper 10 is attached. Therefore, the side portions 14 may "wraparound" or curve from the front portion 12 and extend at an angle transverse to the front portion 12.

Further, the vehicle bumper 10 may include at least one grille support portion 16 extending from the front portion 12 (or, e.g., one of the side portions 14) in a direction away from the front portion 12 and/or the side portions 14. The at least one grille support portion 16 may be configured to extend around at least a portion of a grille of the vehicle. In one or more embodiments, the at least one grille support portion 16 may define a narrow portion or extend from the remainder of the vehicle bumper 10 in a cantilevered way. Therefore, the bumper apparatus 100 may include specific components (e.g., the front coupler arms, as described herein) to better securely couple to and position the at least one grille support portion 16. Additionally, the vehicle bumper 10 may include any number of grille support portions. For example, as shown in FIGS. 1A-1C, the vehicle bumper 10 includes four grille support portions 16 on various sides (e.g., the left, right, and bottom sides) of an opening for the vehicle grille.

The bumper apparatus 100 includes a base support structure 110 and a frame 120 coupled to the base support structure 110, as illustrated in FIGS. 1A-1C. As shown, the base support structure 110 supports the frame 120 above the ground surface 103. The base support structure 110 may include at least one leg 114 and one or more ground engaging members 115 coupled to the at least one leg 114 to support the at least one leg 114 above the ground surface 103.

The base support structure 110 may include any number of suitable legs 114. For example, as shown in FIGS. 1A-1C, the base support structure 110 may include two legs 114 spaced apart from one another. Further, as shown in FIGS. 1A-1C, the two legs 114 may be oriented at an angle relative to one another to, e.g., allow the legs 114 (and thus, the bumper apparatus 110) to nest within legs of a different bumper apparatus (e.g., for compactness of storage of multiple bumper apparatuses). However, in some embodiments, the legs 114 may be oriented parallel to one another.

The one or more ground engaging members 115 may include any suitable structure used to interface with the ground surface 103. For example, the one or more ground engaging members 115 may include wheels, rubber stops, rails, tracks, etc. For example, as shown in FIGS. 1A-1C, the one or more ground engaging members 115 include wheels that are configurable to be locked or unlocked such that the wheels roll when unlocked and are restricted from rolling when locked. The base support structure 110 may include any suitable number of ground engaging members 115. For example, as shown in FIGS. 1A-1C, there are two ground engaging members 115 on each end of each of the legs 114.

The base support structure 110 may also include at least one vertical member 112 coupled between the at least one leg 114 and the frame 120. In other words, the at least one vertical member 112 may be coupled to both the at least one leg 114 and the frame 120 and may extend therebetween. Additionally, in some embodiments, the base support structure 110 may include at least one brace coupled to and extending between the at least one leg 114 and the at least one vertical member 112 to, e.g., help stabilize the vertical member 112 relative to the leg 114. The at least one vertical member 112 may extend in a generally vertical orientation to support the frame 120 away from the legs 114. The base support structure 110 may include any number of suitable vertical members 112. For example, as shown in FIGS. 1A-1C, there are two vertical members 112 extending between the legs 114 and the frame 120.

In one or more embodiments, the at least one leg 114 may include a first leg (e.g., a right leg) and a second leg (e.g., a left leg). Similarly, the at least one vertical member 112 may include a first vertical member (e.g., a right vertical member) and a second vertical member (e.g., a left vertical member). The first vertical member 112 may be coupled to and extending between the first leg 114 and a side portion (e.g., the right-side bar portion 122) of the frame 120. The second vertical member 112 may be coupled to and extending between the second leg 114 and the other side portion (e.g., the left-side bar portion 124) of the frame 120.

In one or more embodiments, the base support structure 110 may also include a cross member 116 coupled to and extending between the first and second legs 114 (e.g., to help stabilize the legs 114 relative to one another). In other embodiments, the cross member 116 may be coupled to and extending between the first and second vertical members 112 (e.g., to help stabilize the vertical members 112 relative to one another). The base support structure 110 may include any suitable number of cross members 116 and the cross members 116 may be located in any suitable position. For example, as shown in FIG. 1B, the base support structure 110 may include a cross member 116 proximate the legs 114 and another cross member 116 proximate the frame 120.

Furthermore, in one or more embodiments, the frame 120 may be configured to move relative to the base support structure 110. For example, the frame 120 may pivot relative to the base support structure 110 such that the vehicle bumper 10 coupled to the bumper apparatus 100 may pivot along with the frame 120. Specifically, the frame 120 (and, e.g., a vehicle bumper 10 coupled thereto) may pivot into a generally horizontal orientation (e.g., as shown in FIG. 1A), into a generally vertical orientation (e.g., as shown in FIG. 1B), and into a position anywhere therebetween. It may be desirable to pivot the vehicle bumper 10 to various angles to provide better access to different portions of the vehicle bumper 10 (e.g., to paint, to repair, etc.). Further, the frame 120 may be secured in various pivoted positions relative to the base support structure 110 in any suitable way including, for example, as described in U.S. Pat. No. 6,173,947 entitled, "Automotive Bumper Stand," which is herein incorporated by reference in its entirety.

Figure 2A:
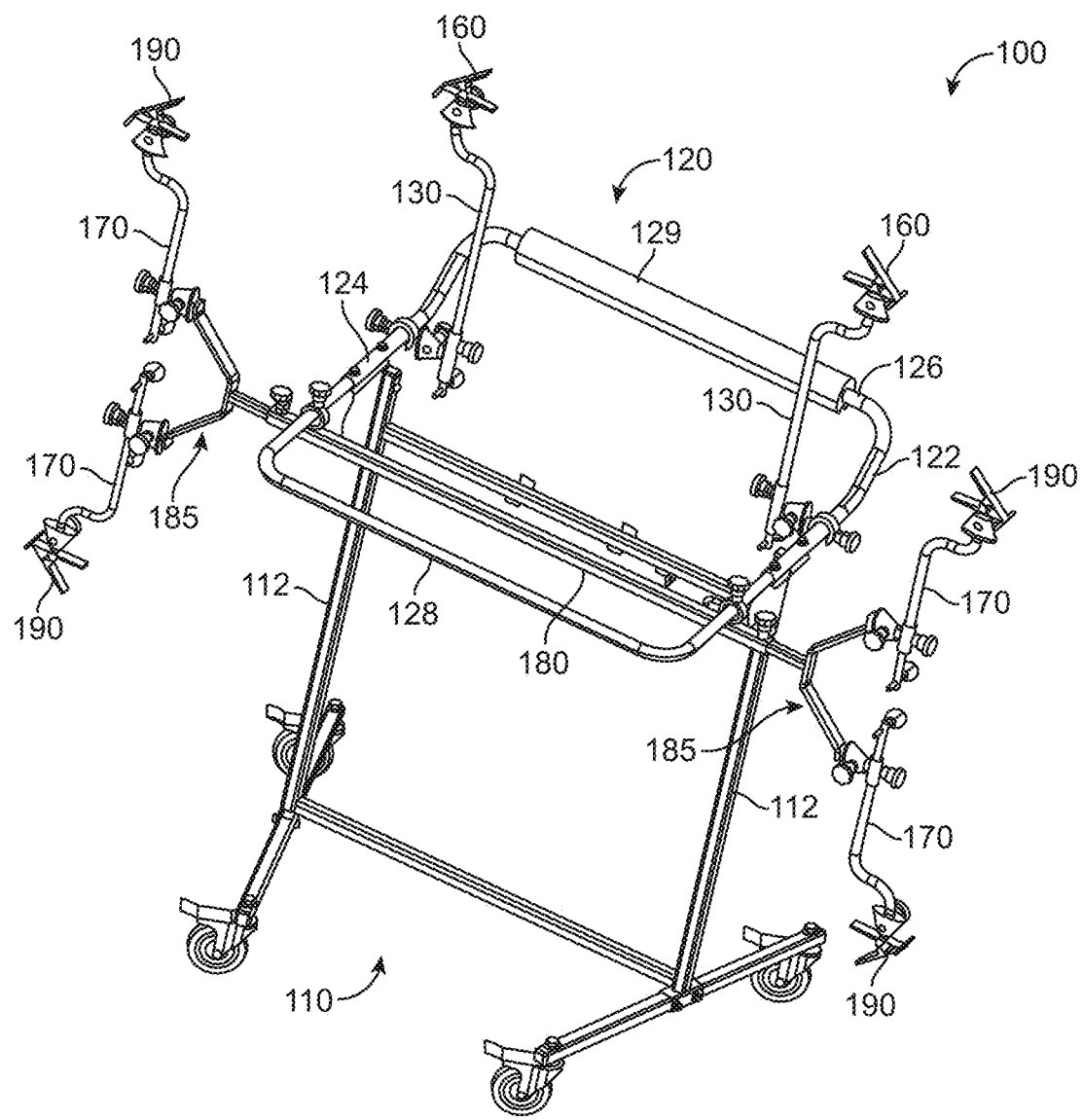
FIG. 2A is a perspective view of the illustrative bumper stand of FIG. 1A.
Figure 2B:
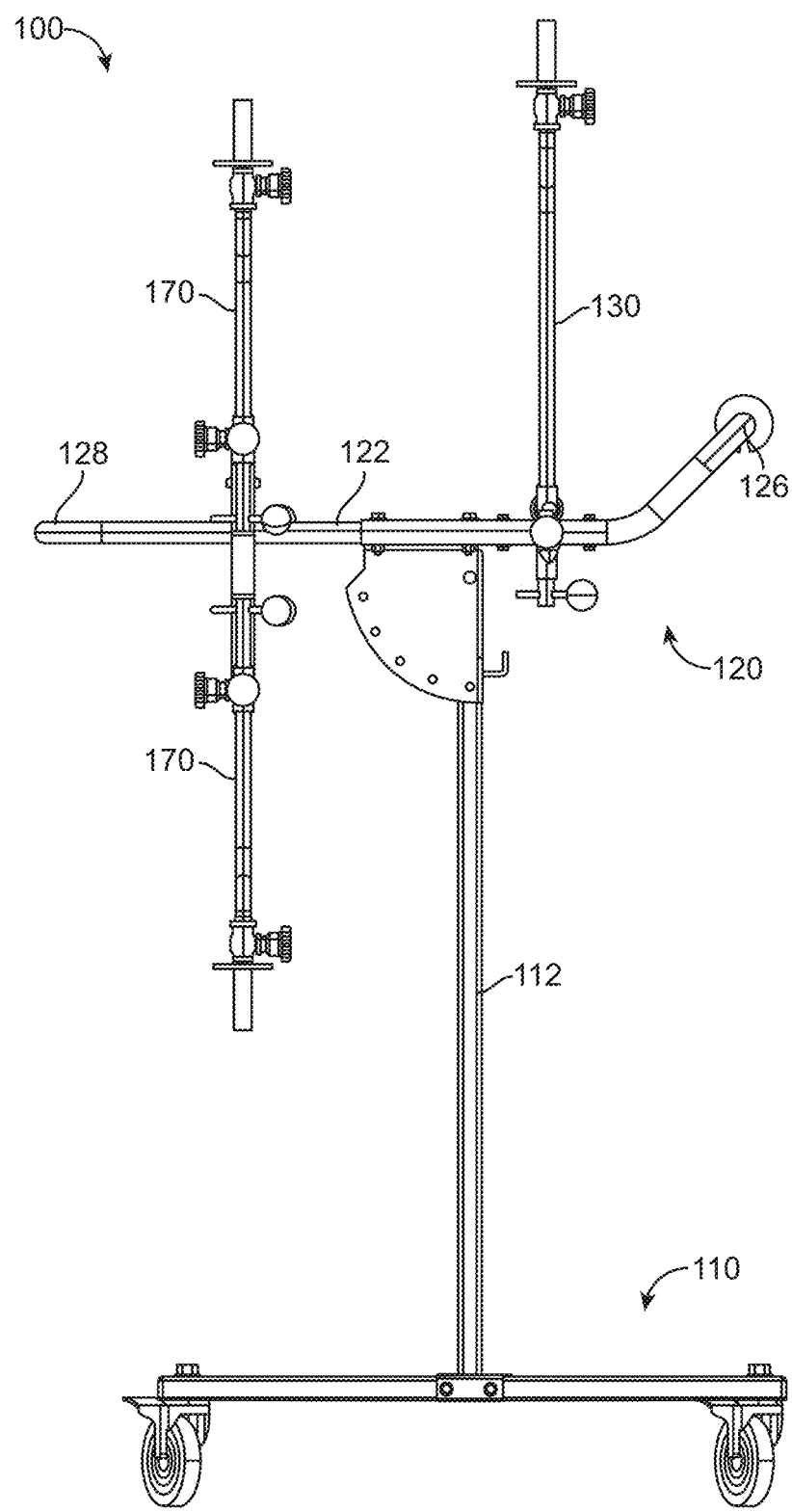
FIG. 2B is a side plan view of the bumper stand of FIG. 2A.

The frame 120 of the bumper apparatus 100 isolated from the vehicle bumper 10 is illustrated in FIGS. 2A-2B. The frame 120 may include various portions used to support the vehicle bumper 10 directly and via other components. For example, the frame 120 may include a right-side bar portion 122, a left-side bar portion 124, a front bar portion 126 between the right-side and left-side bar portions 122, 124, and a rear bar portion 128 between the right-side and left-side bar portions 122, 124. The various portions of the frame 120 are described relative to one another (e.g., the front bar portion 126 is located at the front of the frame 120, the right-side bar portion 122 is located at the right of the frame 120, etc.) and in relation to the portion of the vehicle bumper 10 being supported.

As shown in FIGS. 2A-2B, the right-side bar portion 122, the left-side bar portion 124, and the rear bar portion 128 may generally extend along a plane and the front bar portion 126 may be elevated or curved above the plane. Further, in one or more embodiments, the frame 120 may include two pieces that are coupled together to form the frame 120 and each of the two pieces may couple together (e.g., one portion configured to be received by the other portion) at the right-side and left-side bar portions 122, 124. Further, the front bar portion 126 may be configured to support the front portion 12 of the vehicle bumper 10 (e.g., as shown in FIG. 1B). In one or more embodiments, the bumper apparatus 100 may include a pad 129 (e.g., foam, rubber, etc.) at the front bar portion 126. The pad 129 may be positioned between the front bar portion 126 of the frame 120 and the front portion 12 of the vehicle bumper 10 (e.g., to provide a pliable surface upon which the vehicle bumper 10 may rest).

The bumper apparatus 100 may also include at least one coupler arm movably coupled to the frame 120. In one or more embodiments, the at least one coupler arm may be described in relation to its position relative to the frame 120. For example, the bumper apparatus 100 may include at least one front coupler arm 130 located proximate the front bar portion 126 of the frame 120 and may include at least one rear coupler arm 170 located proximate the rear bar portion 128 of the frame 120. Specifically, the at least one front coupler arm 130 may described as movably coupled to the frame 120 forward of a point at which the frame 120 is coupled to the base support structure 110. More specifically, the at least one front coupler arm 130 may be described as movably coupled to the frame 120 forward of the at least one vertical member 112. For example, as shown in FIG. 2B, the at least one front coupler arm 130 may be located on the side of the vertical member 112 closer to the front bar portion 126 of the frame 120. On the other hand, the at least one rear coupler arm 170 may be described as movably coupled to the frame 120 rearward of the at least one vertical member 112 (e.g., on the side of the vertical member 112 closer to the rear bar portion 128 of the frame 120).

The proximity of the at least one front coupler arm 130 to the front bar portion 126 of the frame 120 may allow the at least one front coupler arm 130 to better access the peripheries of the vehicle bumper 10 (e.g., to securely couple to and position the grille support portion 16 of the vehicle bumper 10). Similarly, the proximity of the at least one rear coupler arm 170 to the rear bar portion 128 of the frame 120 may allow the at least one rear coupler arm 170 to better access the peripheries of the vehicle bumper 10 (e.g., to securely couple to and position the side portions 14 of the vehicle bumper 10). Further, each of the coupler arms (e.g., front coupler arms 130 and rear coupler arms 170) may include a coupler movably coupled to the corresponding coupler arm. The coupler may be configured to be releasably coupled to a portion of the vehicle bumper 10 (e.g., through clamping, through connection to a pin, etc.). Specifically, the coupler may be releasably couplable to an interior surface of the vehicle bumper 10 so that the exterior surface of the vehicle bumper 10 may be exposed and unobstructed. The bumper apparatus 100 may include a front coupler 160 corresponding to each front coupler arm 130 and a rear coupler 190 corresponding to each rear coupler arm 170. It is noted that each of the front coupler 160 and the rear coupler 190 are similar in function and structure, but include a modifier (e.g., "front" or "rear") based on the coupler arm upon which it is coupled.

In one or more embodiments, the front coupler 160 may be movably coupled to the at least one front coupler arm 130 and may be configured to be releasably coupled to the grille support portion 16 of the vehicle bumper 10. Also, in one or more embodiments, the rear coupler 190 may be movably coupled to the at least one rear coupler arm 170 and may be configured to be releasably coupled to one of the side portions 14 of the vehicle bumper 10. As such, the front and rear couplers 160, 190 may be releasably couplable to the vehicle bumper 10 at various locations to help maintain the shape of the vehicle bumper 10.

The bumper apparatus 100 may include any number of front and rear coupler arms 130, 170. For example, as shown in FIG. 2A, the bumper apparatus 100 may include a first front coupler arm 130 and a second front coupler arm 130 (e.g., one on each side of the frame 120). Each of the front coupler arms 130 may be independently movably coupled to the frame 120 and may move independently from one another. In other words, each of the front coupler arms 130 may be specifically adjusted to accommodate different bumper configurations (e.g., corresponding to the grille support portions 16 of the vehicle bumper 10).

Previous stands have not included any front coupler arms, and instead only relied on a front bar. The front coupler arms 130, among other parts or portions of the bumper apparatus 100, as described herein solves a new problem that previous stands did not need to address. More specifically, plastic bumpers had previously been less intricate or had better support, and thus, needed less support from a stand during repair and/or painting. The front coupler arms 130, among other parts or portions of the bumper apparatus 100, provide the support to more intricate, less supportive bumpers that did not exist or at least were less common previously. In at least one embodiment, the bumper apparatus 100 may include more than four couplers arms or provide at least one front coupler arm to provide such support for such more intricate, less supportive bumpers.

Further, the bumper apparatus 100 may include a first rear coupler arm 170 and a second rear coupler arm 170. In one embodiment, the first and second rear coupler arms 170 may be arranged on either side of the frame 120 (e.g., similar to the front coupler arms 130). In some embodiments, the bumper apparatus 100 may include a cross bar member 180 extending between and movably coupled to two portions of the frame 120 (e.g., the right-side and left-side bar portions 122, 124). The cross bar member 180 may move relative to the frame 120 between the front bar portion 126 and the rear bar portion 128. In one or more embodiments, the rear coupler arms 170 may be coupled to cross bar member 180 (e.g., on either side of the cross bar member 180). In other words, the rear coupler arms 170 may be coupled to the cross bar member 180 such that the cross bar member 180 may extend between the first and second rear coupler arms 170. In such embodiments, the rear coupler arms 170 may move relative to the cross bar member 180 in directions into and out of the cross bar member 180 (e.g., therefore adjusting the distance between the right-side or left-side bar portion 122, 124 and the corresponding rear coupler arm 170).

Figure 4:
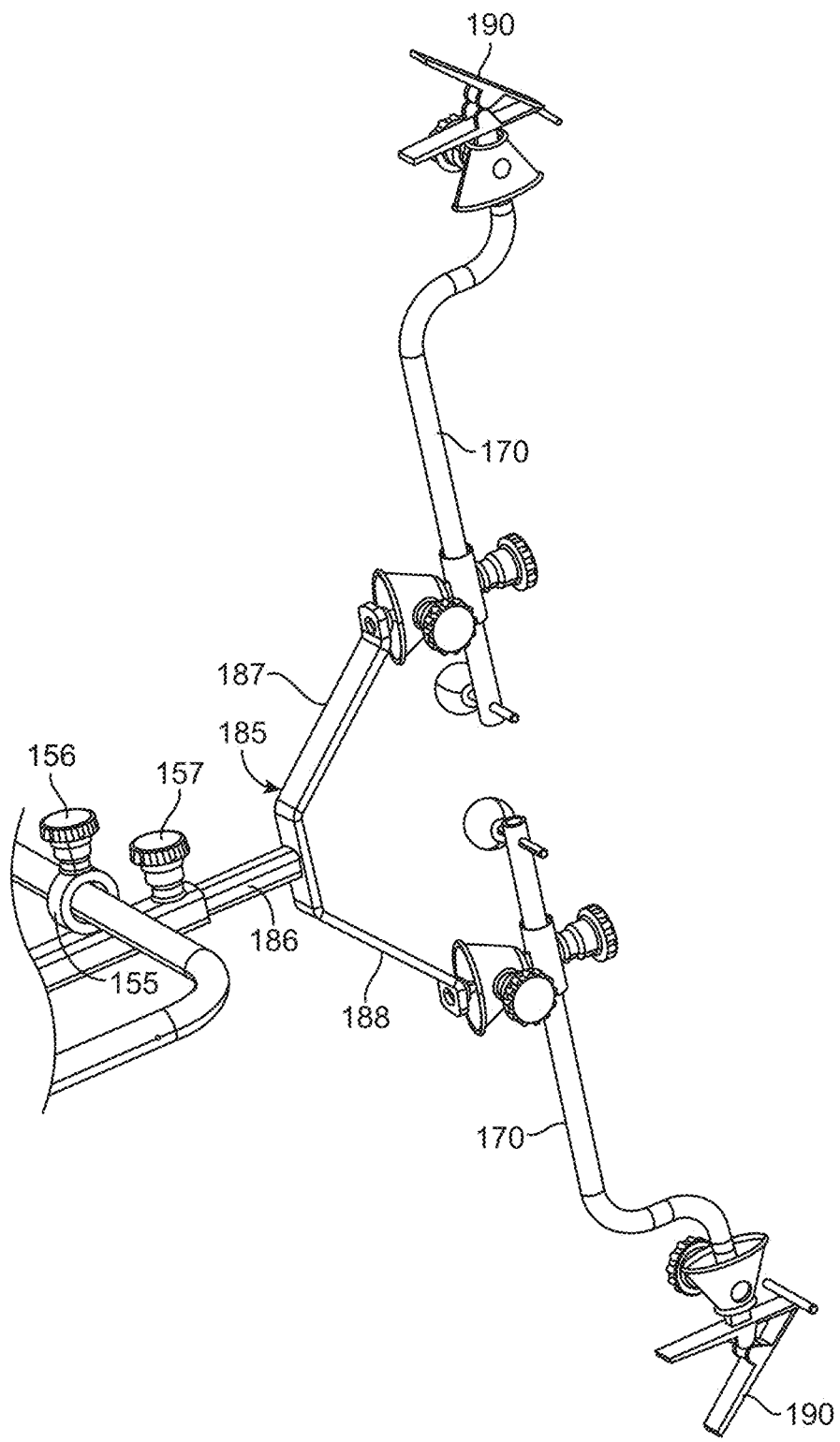
FIG. 4 is an expanded view of multiple coupler arms movably coupled to a frame of the bumper stand of FIG. 2A.

In other embodiments, the bumper apparatus 100 may include a multiple arm extension 185 coupled to and between the frame 120 (e.g., the cross bar member 180) and at least one rear coupler arm 170. Further, the multiple arm extension 185 may be configured to receive multiple coupler arms. For example, as shown in FIG. 2A, the multiple arm extension 185 is coupled to the cross bar member 180 and two rear coupler arms 170 (e.g., a first rear coupler arm and a second rear coupler arm). Specifically, as shown in FIG. 4, the multiple arm extension 185 may include a trunk portion 186 movably coupled to the frame 120, a first branch portion 187 movably coupled to the first rear coupler arm 170, and a second branch portion 188 movably coupled to the second rear coupler arm 170. The multiple arm extension 185 may be movably coupled to the cross bar member 180 such that the multiple arm extension 185 (and, therefore, the rear coupler arms 170 coupled thereto) may extend into or out of the cross bar member 180. Further, the rear coupler arms 170 may be movably coupled to the multiple arm extension 185 to pivot or rotate about an axis point, as will be described in further detail herein with respect to the front coupler arms 130.

The multiple rear coupler arms 170 movably coupled to the multiple arm extension 185 may be oriented in any suitable way. For example, as shown in FIG. 2A, the rear coupler arms 170 on one side of the frame 120 may be oriented vertical to one another (e.g., the first and second branch portions 187, 188 are separated from each other in the vertical direction). When the rear coupler arms 170 are oriented vertical to one another (e.g., on a given side of the frame 120), the couplers 190 of the rear coupler arms 170 may be more easily couplable proximate the top edge and bottom edge of the side portion 14 of the vehicle bumper 10 (e.g., thereby stabilizing the outermost edges of the vehicle bumper 10). In other embodiments, the multiple arm extension 185 may be oriented such that the rear coupler arms 170 are oriented horizontal to one another (e.g., separated along the horizontal direction).

It is noted that any combination of front and rear coupler arms 130, 170 is contemplated by this disclosure. Further, the bumper apparatus 100 may include four or more coupler arms and, as shown in FIG. 2A, may include six coupler arms. Further yet, the front and rear coupler arms 130, 170 may be movably coupled to the frame 120 such that each of the front and rear coupler arms 130, 170 is adjustable in discrete ways (e.g., translated linearly, pivoted/rotated about a set axis point, etc.) to precisely position the corresponding couplers 160, 190 relative to the vehicle bumper 10.

Figure 3A:
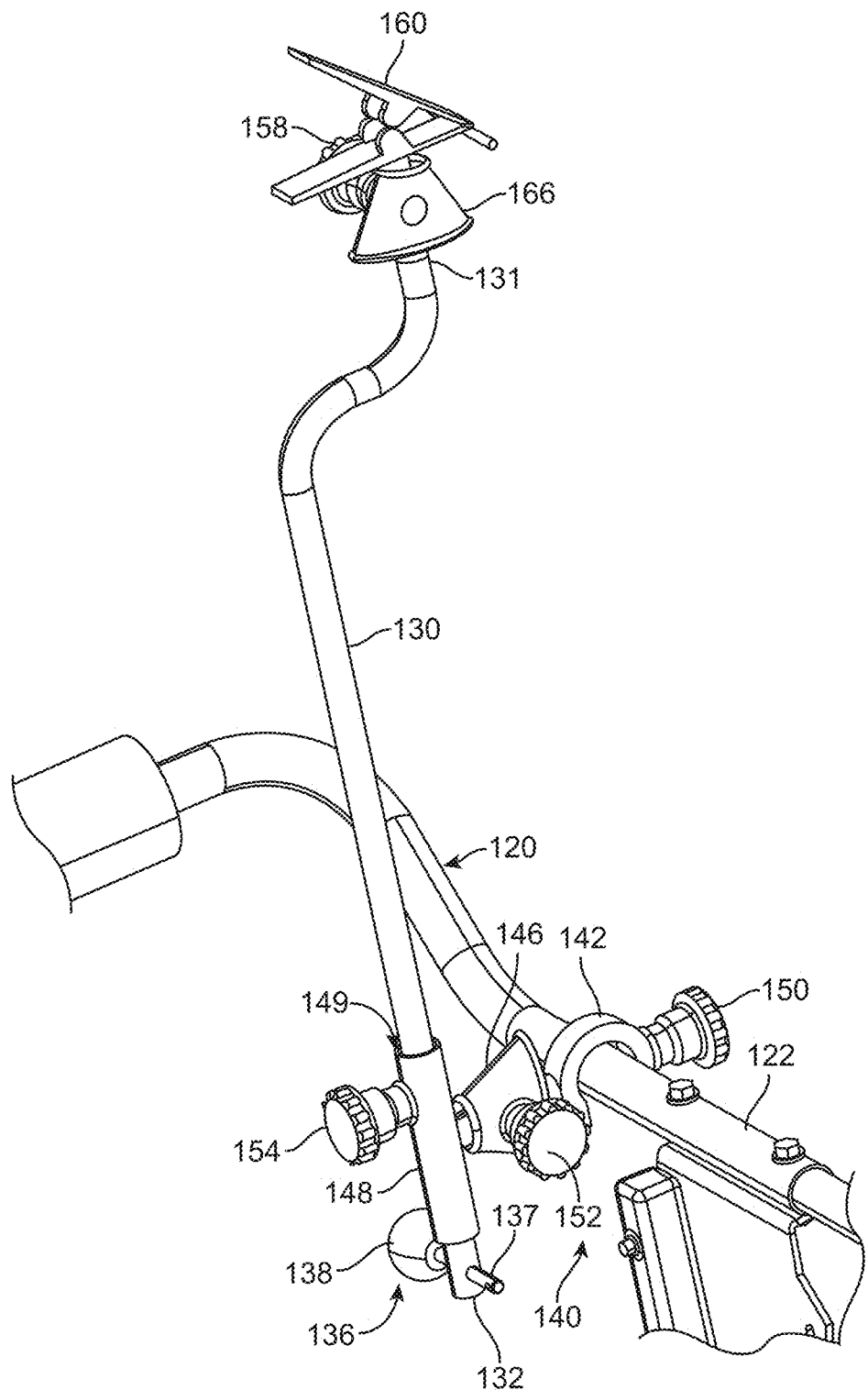
FIG. 3A is an expanded view of a coupler arm movably coupled to a frame of the bumper stand of FIG. 2A.
Figure 3B:
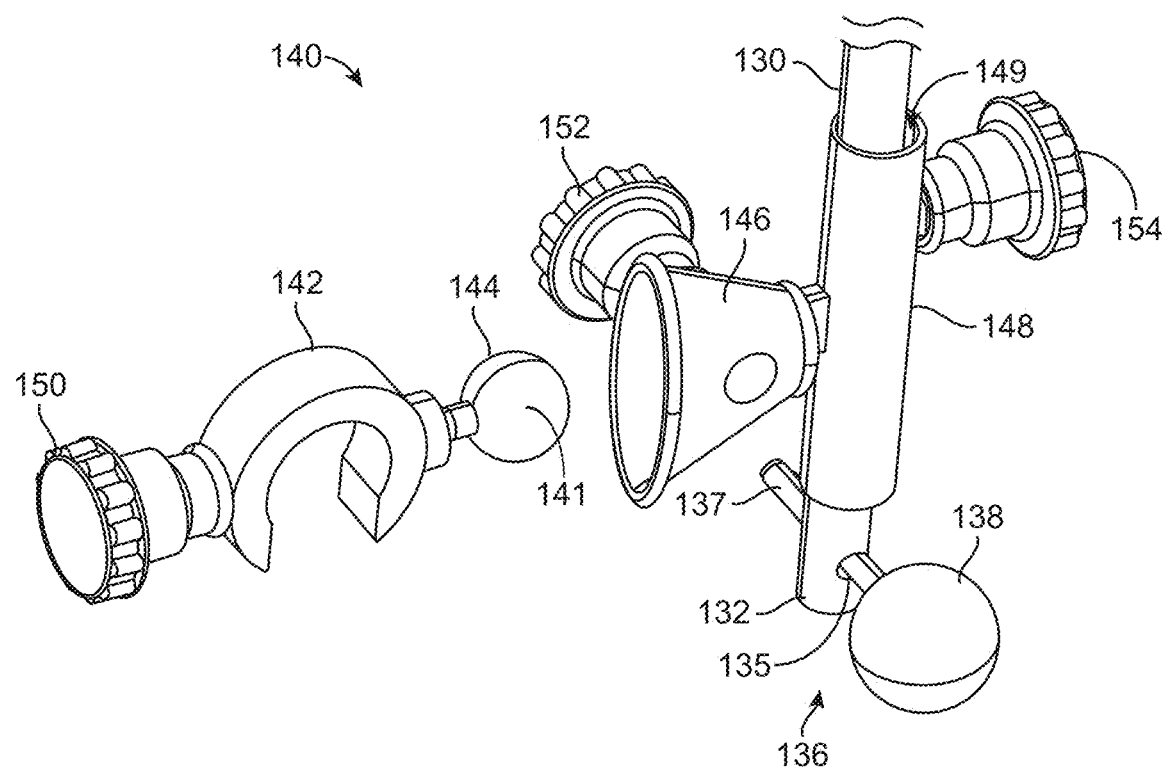
FIG. 3B is an expanded and exploded view of a portion of the coupler arm of FIG. 3A.

For example, as shown in FIG. 3A-3B, the bumper apparatus 100 may include a coupler attachment 140 to couple the coupler arm 130 to the frame 120. The coupler attachment 140 is described in relation to the front coupler arm 130, but the rear coupler arm 170 may be movably coupled to the multiple arm extension 185, the cross bar member 180, or the frame 120 using similar functions and/or structure as the coupler attachment 140. The coupler attachment 140 may include a frame portion 142 movably coupled to the frame 120. The coupler attachment 140 may also include a ball portion 144 fixedly coupled to the frame portion 120 (e.g., as shown in FIG. 3B) and a socket portion 146 configured to receive the ball portion 144 such that the ball portion 144 pivots or rotates relative to the socket portion 146. Further, the coupler attachment 140 may include an arm portion 148 fixedly coupled to the socket portion 146 and movably coupled to the coupler arm 130.

The bumper apparatus 100 may also include various locking apparatus to help allow and restrict movement between different components that are movably coupled to one another. For example, the locking apparatus may include any suitable components that are coupled to a first component and restrict motion of the second component. Specifically, the locking apparatus may be any rigid member that when, e.g., fastened, screwed, pivoted, rotated relative to the first component, the rigid member restricts movement of the second component (e.g., through direct contact with the second component). Additionally, the locking apparatus may include a handle to assist in moving the rigid member.

As shown in FIG. 3A, the frame portion 142 of the coupler attachment 140 may be movably coupled to the frame 120. For example, the frame portion 142 may move along the right-side bar portion 122 or the left-side bar portion 124 of the frame 120. In one or more embodiments, the frame portion 142 may extend partially around the bar of the frame 120 (e.g., in a C-shape). Therefore, the frame portion 142 may slide along the frame 120, but still may be easily removable from the frame 120 when moved in a direction not restricted by the C-shape. In other embodiments, the frame portion 142 may extend entirely around a bar of the frame 120. For example, as shown in FIG. 4, a looped portion 155 extends around a bar of the frame 120 and movably couples the cross bar member 180 to the frame 120. The looped portion 155 that extends entirely around the bar of the frame 120 may be removed from the frame 120 at the point at which the two portions of the frame 120 are removed from one another (e.g., such that the looped portion 155 may slide beyond the end of the bar of the frame 120 when removed).

Further, the bumper apparatus 100 may include a frame locking apparatus 150 (e.g., as shown in FIGS. 3A-3B) configurable between a locked position and an unlocked position. The frame locking apparatus 150 may allow movement between the frame 120 and the frame portion 142 when in the unlocked position and may restrict movement between the frame 120 and the frame portion 142 when in the locked position. In one or more embodiments, the frame locking apparatus 150 may be adapted to move relative to the frame portion 142 between directly contacting the frame 120 when in the locked position and positioned away from the frame 120 when in the unlocked position. In other embodiments, the frame locking apparatus 150 may be adapted to move relative to the frame 120 and directly contact or be spaced from the frame portion 142.

FIGS. 3A-3B illustrate the ball portion 144 and the corresponding socket portion 146 that is configured to receive the ball portion 144. The ball portion 144 may be fixable relative to the frame 120 and the socket portion 146 may be fixable relative to the coupler arm 130 such that the coupler arm 130 may move relative to the frame 120. In one or more embodiments, the ball portion 144 may be fixable relative to the coupler arm 130 and the socket portion 146 may be fixable relative to the frame 120. The socket portion 146 may rotate or pivot relative to the ball portion 144 about a frame axis point 141. In other words, the coupler arm 130 may rotate in any direction about the frame axis point 141 via the ball and socket. As such, the coupler arm 130 may rotate about a known point (e.g., the frame axis point 141) in a controlled manner.

The bumper apparatus may include a ball socket locking apparatus 152 configurable between a locked position and an unlocked position. The ball socket locking apparatus 152 may allow movement between the ball portion 144 and the socket portion 146 when in the unlocked position and may restrict movement between the ball portion 144 and the socket portion 146 when in the locked position. In one or more embodiments, the ball socket locking apparatus 152 may be adapted to move relative to the socket portion 146 between directly contacting the ball portion 144 when in the locked position and positioned away from the ball portion 144 when in the unlocked position.

As shown in FIGS. 3A-3B, the coupler attachment 140 may also include an arm portion 148 configured to allow the coupler arm 130 to move linearly relative to the frame 120. For example, the arm portion 148 may be fixedly coupled to the socket portion 146 (which may be fixable relative to the frame 120) and may be movably coupled to the coupler arm 130. The arm portion 148 may define any shape that may allow the coupler arm to move linearly relative to the arm portion 148. Specifically, FIGS. 3A-3B illustrate the arm portion 148 including a tubular shape and defining an opening 149 to receive the coupler arm 130 such that the coupler arm 130 translates linearly relative to the arm portion 148. As such, the arm portion 148 may slide along the coupler arm 130 between a first end 131 of the coupler arm 130 and a second end 132 of the coupler arm 130.

The arm portion 148 and/or the coupler arm 130 may include any suitable components to prevent the arm portion 148 from being removed from the coupler arm 130 at an undesired time. For example, as shown in FIG. 3A, the first end 131 of the coupler arm 130 defines a curved shape and includes the coupler 160, which may prevent the arm portion 148 from extending beyond the first end 131 of the coupler arm 130. Also, for example as shown in FIGS. 3A-3B, the coupler arm 130 defines an opening 135 proximate the second end 132 of the coupler arm 130 and comprises a stop member 136 configured to be inserted through the opening 135. The stop member 136, when inserted through the opening 135, may prevent the arm portion 148 from moving past the second end 132 of the coupler arm 130. The stop member 136 may define any shape and size to prevent the arm portion 148 from extending beyond the second end 132 of the coupler arm 130 (e.g., whether the stop member 36 is designed to be inserted through the opening 135 or not). As shown, the stop member 136 includes a pin 137 (e.g., to be inserted through the opening 135) and a handle 138 (e.g., to be grasped by a user).

The bumper apparatus 100 may further include an arm portion locking apparatus 154 configurable between a locked position and an unlocked position. The arm portion locking apparatus 154 may allow movement between the arm portion 148 and the coupler arm 130 when in the unlocked position and may restrict movement between the arm portion 148 and the coupler arm 130 when in the locked position. In one or more embodiments, arm portion locking apparatus 154 may be adapted to move relative to the arm portion 148 between directly contacting the coupler arm 130 when in the locked position and positioned away from the coupler arm 130 when in the unlocked position.

Further, in one or more embodiments, the bumper apparatus 100 may include a cross bar member locking apparatus 156 (e.g., as shown in FIG. 4) configurable between a locked position and an unlocked position. The cross bar member locking apparatus 156 may allow movement between the cross bar member 180 and the frame 120 when in the unlocked position and may restrict movement between the cross bar member 180 and the frame 120 when in the locked position. In one or more embodiments, the cross bar member locking apparatus 156 may be adapted to move relative to the cross bar member 180 between directly contacting the frame 120 when in the locked position and positioned away from the frame 120 when in the unlocked position. In other embodiments, the cross bar member locking apparatus 156 may be adapted to move relative to the frame 120 between directly contacting the cross bar member 180 when in the locked position and positioned away from the cross bar member 180 when in the unlocked position.

Figure 3C:
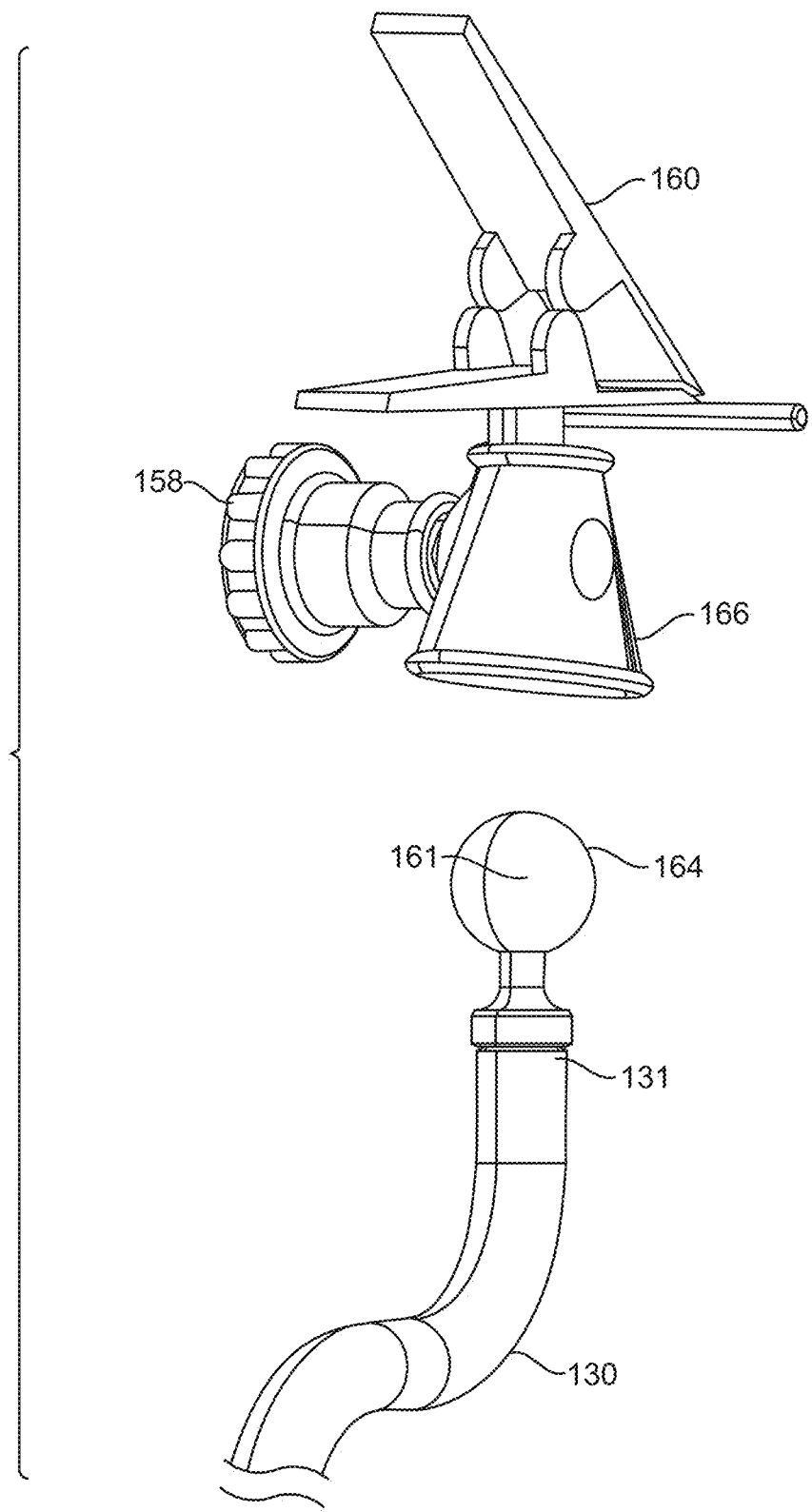
FIG. 3C is an expanded and exploded view of another portion of the coupler arm of FIG. 3A.

As shown in FIG. 3C, the coupler 160 may be movably coupled to the coupler arm 130 proximate the first end 131. Further, in one or more embodiments, the coupler 160 may also be movably coupled to the coupler arm 130 using a ball/socket mechanism. For example, the coupler arm 130 may include a ball portion 164 fixedly coupled at the first end 131 of the coupler arm 130 and the coupler 160 may include a socket portion 166 fixedly coupled thereto. The socket portion 166 may be configured to receive the ball portion 164 such that the coupler 160 may move relative to the coupler arm 130. The socket portion 166 may rotate or pivot relative to the ball portion 164 about a coupler axis point 161. In other words, the coupler 160 may rotate in any direction about the coupler axis point 161 via the ball and socket. As such, the coupler 160 may rotate about a known point (e.g., the coupler axis point 161) in a controlled manner.

The bumper apparatus 100 may further include coupler locking apparatus 158 configurable between a locked position and an unlocked position (e.g., similar to the ball socket locking apparatus 152). The coupler locking apparatus 158 may allow movement between the ball portion 164 and the socket portion 166 when in the unlocked position and may restrict movement between the ball portion 164 and the socket portion 166 when in the locked position. In one or more embodiments, the coupler locking apparatus 158 may be adapted to move relative to the socket portion 166 between directly contacting the ball portion 164 when in the locked position and positioned away from the ball portion 164 when in the unlocked position.

Furthermore, the coupler arms 170 illustrated in FIG. 4 may include similar features as the coupler arms 130 described in connection with FIGS. 3A-3C. For example, the coupler arms 170 may include a coupler attachment including a ball portion, a socket portion, and an arm portion. Further, the coupler 190 may include similar function and structure as coupler 160 described herein. Additionally, the bumper apparatus 100 may include a multiple extension locking apparatus 157 between the multiple arm extension 185 and the cross bar member 180 that is configurable between a locked position and an unlocked position. The multiple extension locking apparatus 157 may include similar features as the locking apparatus described herein to allow and restrict movement between the multiple arm extension 185 and the cross bar member 180.

Figure 5:
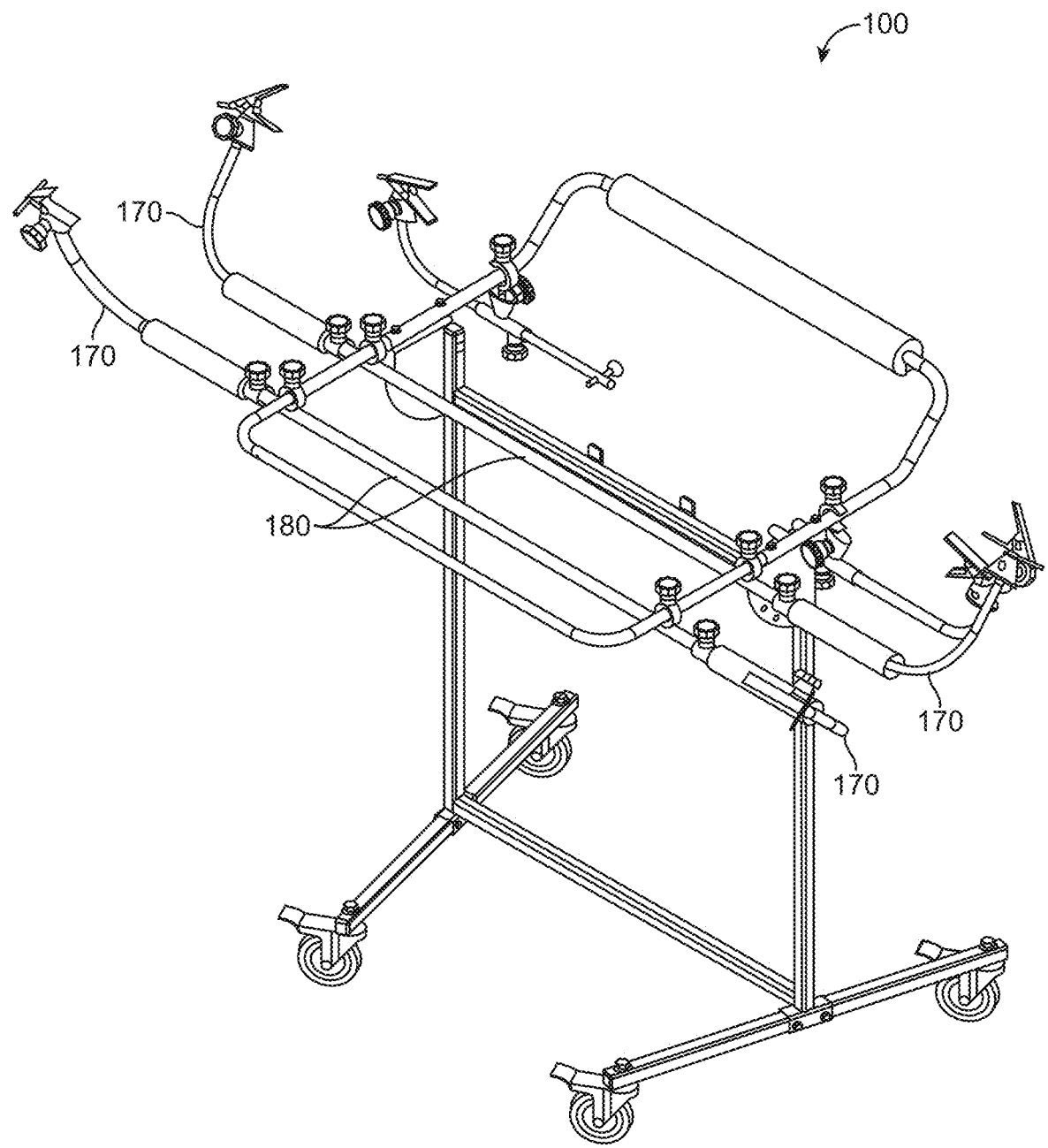
FIG. 5 is a perspective view of an additional illustrative bumper stand.

FIG. 5 illustrates an additional illustrative embodiment of the bumper apparatus 100 including rear coupler arms 170 movably coupled to a cross bar member 180 (e.g., without a multiple arm extension). In other words, the bumper apparatus 100 may include multiple cross bar members 180 having coupler arms 170 attached on either end of the cross bar member 180.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. An apparatus for securing a vehicle bumper during painting and repair, the apparatus comprising:
a base support structure;
a frame coupled to the base support structure;
at least one rear coupler arm movably coupled to the frame;
at least one front coupler arm movably coupled to the frame via a front coupler attachment, wherein the front coupler attachment comprises:
a frame portion movably coupled to the frame,
a ball portion fixedly coupled to the frame portion,
a socket portion configured to receive the ball portion such that the ball portion pivots relative to the socket portion, and
an arm portion fixedly coupled to the socket portion and movably coupled to the at least one front coupler arm; and
a front coupler movably coupled to the at least one front coupler arm, wherein the front coupler is configured to be releasably coupled to the vehicle bumper.

2. The apparatus of claim 1, wherein the at least one front coupler arm comprises a first front coupler arm and a second front coupler arm, wherein the first and second front coupler arms are independently movably coupled to the frame and move independently from one another.

3. The apparatus of claim 1, wherein the base support structure comprises at least one vertical member, wherein the frame is coupled to the at least one vertical member of the base support structure, wherein the at least one front coupler arm is movably coupled to the frame forward of the at least one vertical member.

4. The apparatus of claim 1, wherein the at least one front coupler arm extends between a first end and a second end, wherein the front coupler is movably coupled to the at least one front coupler arm proximate the first end and the arm portion is movably coupled to the at least one front coupler arm between the first and second ends.

5. The apparatus of claim 4, wherein the at least one front coupler arm defines an opening proximate the second end of the at least one front coupler arm, wherein the at least one front coupler arm comprises a stop member configured to be inserted through the opening such that when the stop member is inserted through the opening, the arm portion is prevented from moving past the second end of the at least one front coupler arm.

6. The apparatus of claim 1, wherein the arm portion defines an opening to receive the at least one front coupler arm such that the at least one front coupler arm translates linearly relative to the arm portion.

7. The apparatus of claim 1, further comprising a cross bar member extending between and movably coupled to two portions of the frame, wherein the at least one rear coupler arm comprises a first rear coupler arm coupled to the cross bar member and a second rear coupler arm coupled to the cross bar member such that the cross bar member extends between the first and second rear coupler arms.

8. The apparatus of claim 1, further comprising a multiple arm extension coupled between the frame and the at least one rear coupler arm, wherein the at least one rear coupler arm comprises a first rear coupler arm and a second rear coupler arm, wherein the multiple arm extension comprises a trunk portion movably coupled to the frame, a first branch portion movably coupled to the first rear coupler arm, and a second branch portion movably coupled to the second rear coupler arm.

9. The apparatus of claim 1, wherein the frame portion of the front coupler attachment extends partially around a bar of the frame.

10. The apparatus of claim 1, wherein the frame portion of the front coupler attachment extends entirely around a bar of the frame.

11. An apparatus for securing a vehicle bumper during painting and repair, the apparatus comprising:

a base support structure;

a frame coupled to the base support structure, the frame comprising a right-side bar portion, a left-side bar portion, a front bar portion between the right-side and left-side bar portions, and a rear bar portion between the right-side and left-side bar portions;

at least one front coupler arm movably coupled to the frame forward of a point at which the frame is coupled to the base support structure, wherein the at least one front coupler arm is movably coupled to the frame such that the at least one front coupler arm is configured to pivot relative to the frame about a frame axis point; and a front coupler movably coupled to the at least one front coupler arm such that the front coupler is configured to pivot relative to the at least one front coupler arm about a coupler axis point, wherein the front coupler is configured to be releasably couplable to the vehicle bumper.

12. The apparatus of claim 11, wherein the at least one front coupler arm comprises a first front coupler arm and a second front coupler arm, wherein the first and second front coupler arms are independently movably coupled to the frame and move independently from one another.

13. The apparatus of claim 11, wherein the base support structure comprises at least one vertical member, wherein the frame is coupled to the at least one vertical member of the base support structure, wherein the at least one front coupler arm is movably coupled to the frame forward of the at least one vertical member.

14. The apparatus of claim 13, wherein the base support structure comprises at least one leg and one or more ground engaging members coupled to the at least one leg to support the at least one leg above a ground surface, wherein the at least one vertical member is coupled to the at least one leg and extending between the at least one leg and the frame.

15. The apparatus of claim 11, further comprising a pad at the front bar portion.

16. The apparatus of claim 11, wherein the frame is movably coupled to the base support structure such that the frame pivots relative to the base support structure between a generally horizontal orientation, a generally vertical orientation, and any angle therebetween.

17. An apparatus for securing a vehicle bumper during painting and repair, wherein the vehicle bumper comprises a front portion and side portions extending from opposite ends of the front portion, wherein the vehicle bumper further comprises at least one grille support portion extending from the front portion in a direction away from the side portions, the apparatus comprising:

a base support structure;

a frame coupled to the base support structure;

at least one rear coupler arm movably coupled to the frame;

a rear coupler movably coupled to the at least one rear coupler arm, wherein the rear coupler is configured to be releasably couplable to one of the side portions of the vehicle bumper;

at least one front coupler arm movably coupled to the frame; and a front coupler movably coupled to the at least one front coupler arm, wherein the front coupler is configured to be releasably couplable to the at least one grille support portion of the vehicle bumper.

18. The apparatus of claim 17, wherein the frame comprises a front bar portion configured to support the front portion of the vehicle bumper.

19. The apparatus of claim 18, further comprising a pad at the front bar portion and configured to be positioned between the front portion of the vehicle bumper and the front bar portion.

20. The apparatus of claim 17, wherein the front coupler and the rear coupler are releasably couplable to the vehicle bumper to maintain shape of the vehicle bumper.

* * * * *